United States Patent [19]

Sollenberger

[11] Patent Number: 4,695,969

[45] Date of Patent: Sep. 22, 1987

[54] EQUALIZER WITH IMPROVED PERFORMANCE

[75] Inventor: Nelson R. Sollenberger, West Keanburg, N.J.

[73] Assignee: American Telephone and Telegraph Company AT&T Bell Laboratories, Murray Hill, N.J.

[21] Appl. No.: 682,378

[22] Filed: Dec. 17, 1984

[51] Int. Cl.[4] .......................................... G06F 15/31
[52] U.S. Cl. .................................... 364/724; 275/13; 333/18
[58] Field of Search ........... 364/724; 333/28 R, 28 T, 333/18; 375/11–14

[56] References Cited

U.S. PATENT DOCUMENTS

| | | | |
|---|---|---|---|
| 3,723,911 | 3/1973 | Forney, Jr. | 375/13 |
| 3,978,435 | 8/1976 | Luvison et al. | 333/18 |
| 4,184,129 | 1/1980 | Macchinee Danjon et al. | 333/18 |
| 4,227,160 | 10/1980 | Tamori et al. | 364/724 |
| 4,290,139 | 9/1981 | Walsh | 333/18 |
| 4,389,623 | 6/1983 | Onishi et al. | 333/16 |
| 4,435,823 | 3/1984 | Davis et al. | 375/14 |
| 4,467,441 | 8/1984 | Gritton | 364/724 |
| 4,481,643 | 11/1984 | Kitazawa | 375/12 |
| 4,483,009 | 11/1984 | Honda et al. | 375/14 |
| 4,575,857 | 3/1986 | Murakami | 375/12 |

OTHER PUBLICATIONS

Sha et al., "Fast Convergence Adaptive Equalizer", vol. 14, No. 10, Mar. 1972, pp. 2953-2954, IBM Tech. Dis. Bul.
T. J. Schonfeld et al., "Rapidly Converging Second-Order Tracking Algorithms for Adaptive Equalization", *IEEE Trans. on Information Theory*, vol. IT–17, No. 5, Sep. 1971, pp. 572-579.
O. S. Kosovych et al., "Automatic Equalization Using a Successive Overrelaxation Iterative Technique", *IEEE Trans. on Information Theory*, vol. IT–21, No. 1, Jan. 1975, pp. 51-58.
A. Cantoni et al., "Fast Adaptive Equaliztion Via an Identification Approach", *ICC '78*, pp. 30.4.1–30.4.4.
W. Andexser, "Equalization of Data Transmission Channels by Means of Adaptive Quantized Feedback", *AEU*, Band 34, 1980, Heft 7/8, pp. 287-292.
S. M. Daniel, "Analysis, Simulation and Realization of an Automatic Digital Wireline Equalizer System", *CDC*, Paper No. FP2-1, pp. 712-716.

*Primary Examiner*—Gary V. Harkcom
*Assistant Examiner*—Mai, Tan Van
*Attorney, Agent, or Firm*—David R. Padnes

[57] ABSTRACT

A technique for converging the tap-weight coefficients of an automatic or adaptive equalizer. The technique utilizes a training period during which time a plurality of identical signal sequences is transmitted. In the equalizer, during a training period, corresponding signal samples from the transmitted sequences are combined and used to generate the equalizer output and revise the tap-weight coefficients to their optimal values. Each combination of corresponding signal samples is an average or is a function which approximates an average.

17 Claims, 4 Drawing Figures

EQUALIZER WITH IMPROVED PERFORMANCE

TECHNICAL FIELD

The present invention relates to the correction of distortion in digital transmission systems and, more particularly, to a transversal equalizer which provides improved performance in noisy transmission channels.

BACKGROUND OF THE INVENTION

Transversal equalizers have long been used to compensate for the time-varying distortion introduced during the propagation of digital data through a transmission channel. The transversal equalizer comprises a tapped delay line, multipliers for multiplying the digital signal in each tap with a tap-weight coefficient, and a combiner which sums the product formed by each multiplier. Adjustment of each tap-weight coefficient to its optimum value can be accomplished by a variety of techniques. The term "optimum value" herein shall be understood to include some specific value or this specific value plus or minus some small coefficient error.

In automatic equalizers, convergence of the tap-weight coefficients to their proper values is provided by the use of a training period wherein known sequences of digital data are transmitted and the coefficients are adjusted based on an error signal. This error signal is equal to the difference between the summed delay line tapped outputs and the expected data values. In adaptive equalizers, the coefficients are continuously adjusted based on the received data whose values are not known apriori, but are estimated by a quantizer which assigns the equalized signal to the closest one of the ideal digital signal levels. Adaptive equalizers can, of course, also utilize a training period to initially set the tap-weight coefficients to their proper values.

The use of a training period to adjust the tap-weight coefficients causes difficulty in noisy transmission channels because the error signal includes a component due to improperly set tap-weight coefficients and a component due to noise. Specifically, while the date sequence is known, it is not known how much of the difference between the received and expected data is due to improperly set tap-weight coefficients and how much of the difference is due to noise in the transmission channel. This distinction is of import since noise is a random and rapidly varying phenomenon whose magnitude has a zero average over time. Accordingly, adjusting the tapweight coefficients in response to the error signal component due to noise is improper and increases the time required for the tap weight coefficients to converge to their optimum values and the resulting coefficient errors.

One technique used to improve the convergence process in noisy transmission channels is to reduce the gain in the equalizer during the training period. While this technique lessens the step-size adjustment of the tap-weight coefficients in response to any sample, and hence, can provide acceptable coefficient errors, the time required for convergence of the coefficients to their optimum values is significantly increased. In many telecommunications applications, this increase in convergence time exceeds system performance objectives. Accordingly, a scheme which shortens the time required to adjust the tap-weight coefficients of an equalizer to their optimum values during their training period and still provide acceptable coefficient errors would be desirable.

SUMMARY OF THE INVENTION

The present invention addresses the problem of converging the tap-weight coefficients of a transversal equalizer to their optimal values when the equalizer is disposed in a noisy transmission channel. In accordance with the persent invention, a training period including a plurality of identical training sequences is transmitted. During the training period, combinations of corresponding signal samples in each training sequence are formed and these combinations are used to generate the equalized output signal and to adjust the tap-weight coefficients. In the disclosed embodiments, each of the combinations of corresponding signal samples forms an average or is a function which approximates an average. After the training period is over, the equalizer returns to conventional operation. Advantageously, the combining of corresponding samples during a training period substantially reduces the time required for convergence of the tap-weight coefficients to acceptable coefficient errors.

An aspect of the present invention is that it can be incorporated within automatic or adaptive transversal equalizers with little increase in circuit complexity.

DETAILED DESCRIPTION OF THE PREFERRED EMBODIMENTS

Figure 1:
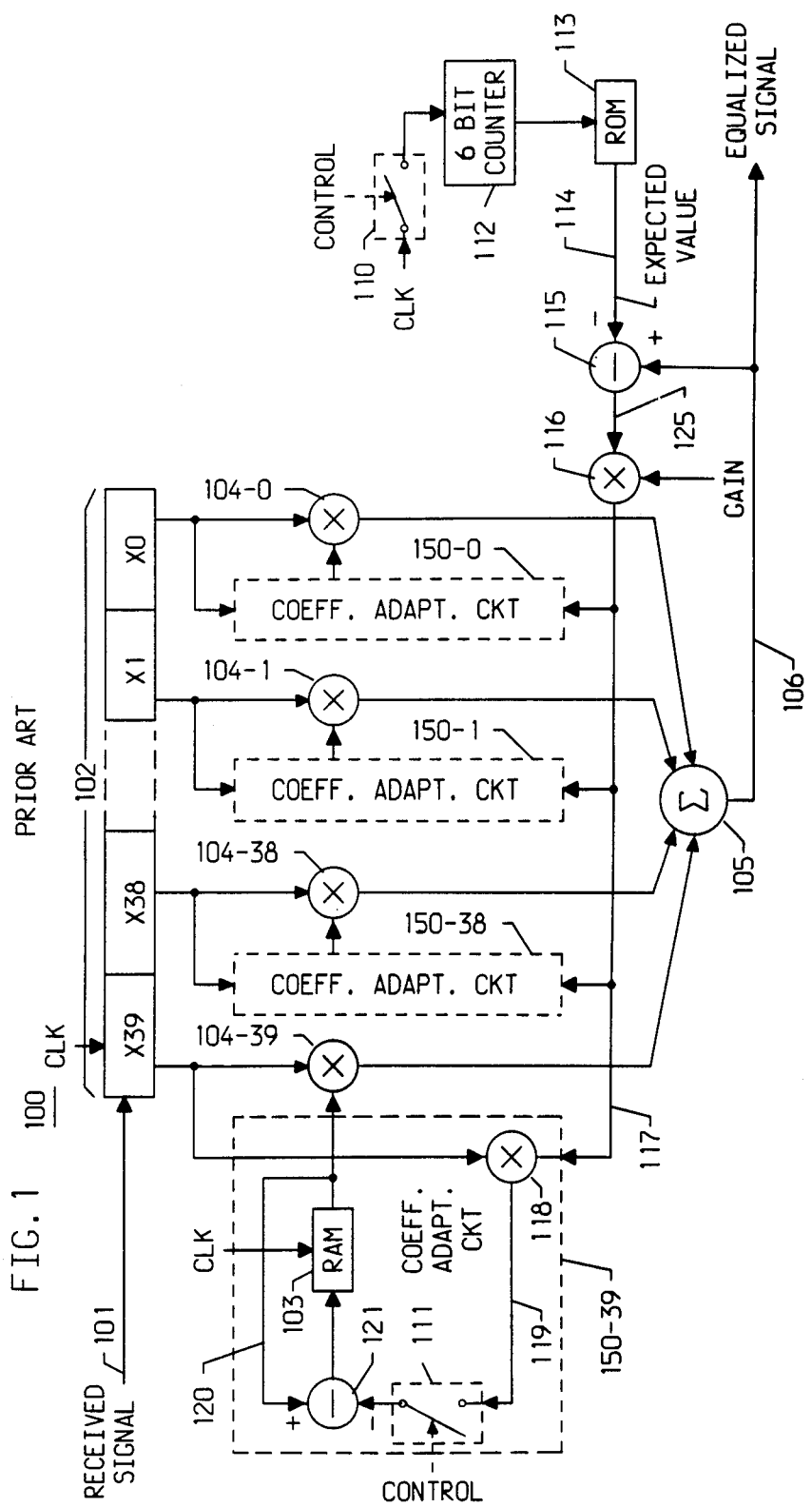
FIG. 1 is a prior art automatic equalizer.

Referring to FIG. 1, an exemplary prior art automatic equalizer 100 is disposed within the receiver of a digital communications system to receive successive samples of the received digital signal on lead 101. The received digital signal can be real or complex and, in either event, the signal samples on lead 101 comprise noise and distortion. Formation of the received signal samples (not shown) can be accomplished using a variety of well-known techniques, such as by strobing a sampling circuit with a clock signal. The clock signal, hereinafter referred to as CLK, is extracted from the received digital signal using conventional clock recovery circuitry or is generated by a free-running oscillator.

The digital signal samples on lead 101 are successively coupled through the 40 cells of shift register 102 on each CLK pulse. The 40 stored samples are designated as $X0, X0 \ldots X39$ wherein $X0$ is the first of the 40 stored samples and $X39$ is the last of the 40 stored samples. Multipliers 104-0 through 104-39 respectively multiply each of the 40 consecutive signal samples within shift register 102 with an associated tap-weight coefficient supplied from RAM 103 within coefficient adaptation circuits 150-0 through 150-39. The equalized digital signal is then generated on lead 106 by adding the products formed by each of the multipliers 104-0 through 104-39 using summer 105.

Equalizaton of the received digital signal requires a particular set of tap-weight coefficients having optimal values. Moreover, as the distortion introduced during signal propagation varies with time, the particular set of tap-weight coefficients also varies with time. To provide the particular set of tap-weight coefficients, a known sequence of digital signals is repetitively transmitted in a time interval known as a training period. While the training sequence comprises a plurality of digital signals which varies with the system application, the number of digital signals in a sequence must be equal to or greater than the number of tap-weight multipliers, designated as 104-0 through 104-39 in FIG. 1, to assure convergence of the tap-weight coefficients to their optimum values. Or, equivalently, the number of digital signals in a sequence must be equal to or greater than the number of digital signals which are combined to form an equalized signal. For equalizers within noisy transmission channels, each training period comprises many identical training sequences. In the illustrative system application, each training sequence comprises 64 digital signals and the sequence is repeated 60 times in each training period.

During each training period, the tap-weight coefficients are driven toward their optimum values by adaptation circuits 150-0 through 150-39. Adaptation circuits 150-0 through 150-39 provide convergence using the well-known least mean squares algorithm. At the onset of each training period, a tone is transmitted from the transmitter to the receiver causing a microprocessor (not shown) to generate control signals which close switches 110 and 111. Upon closure, switch 110 couples CLK to 6-bit counter 112. Counter 112, which increments in response to each CLK pulse, provides an address to ROM 113. ROM 113 stores the 64 expected digital signal values in each training sequence in sequential locations and reads out an expected digital signal value onto lead 114 in response to each address. Subtractor 115 produces an error signal on lead 125 by forming the difference between each equalized digital signal on lead 106 and the expected value of this digital signal on lead 114. This error signal is then multiplied or scaled by an appropriate gain constant via multiplier 116 and the resulting product is supplied on lead 117 to coefficient adaptation circuits 150-0 through 150-39.

Multiplier 118 within each adaptation circuit multiplies the scaled error signal with the associated one of the stored digital signal samples within shift register 102. This product which appears on lead 119 represents the positive or negative incremental change required in the tap-weight coefficient stored within RAM 103. RAM 103 strobed by CLK reads out the stored coefficients onto lead 120 on each CLK pulse. Subtractor 121 then forms the difference between the stored coefficient and the incremental change on lead 119. This difference is then written into RAM 103 by a CLK pulse. After the training period is completed or after a predetermined period of time, the microprocessor-generated control signals open switches 110 and 111 and the stored tap-weight coefficients are fixed until the next training period.

This process of using a training period to converge the tap-weight coefficients to their optimum values can be repeated as often as necessary. In general, the more rapidly varying the transmission channel transfer function, the more frequent the training periods. At this juncture, it should be noted that adaptation circuits 150-0 through 150-39 are configured to converge the tap-weight coefficients using the well-known least mean squares algorithm. It will, of course, be understood that any of a number of other well-known algorithms such as zero-forcing or hybrid least mean squars could be used in this equalizer and in the embodiments of the present invention, which will be discussed.

A problem with the use of training periods is that in noisy transmission channels it is not known how much of the error signal generated on lead 125 is due to improperly set tap-weight coefficients and how much of the error signal is due to noise. Adjustment of the tap-weight coefficients should not be made in response to the error signal component due to noise since noise has a zero average magnitude and varies at a rate comparable to the information rate. Accordingly, adjusting the tap-weight coefficient in response to noise increases the time required for driving these coefficients to their optimum values and increases the resulting coefficient errors.

To reduce the impact of adjusting the tap-weight coefficient stored within each RAM 103 during the presence of noise, an automatic equalizer in accordance with the present invention combines each of the corresponding digital signals within the successive and identical training sequences in a training period. In other words, the $X_J$ sample in any training sequence where $J=0$ through 63 is combined with the $X_J$ sample in all other training sequences in a training period. In the disclosed embodiments, this combination of corresponding samples forms an average of these samples or is a function which approximates an average of these samples.

Figure 2:
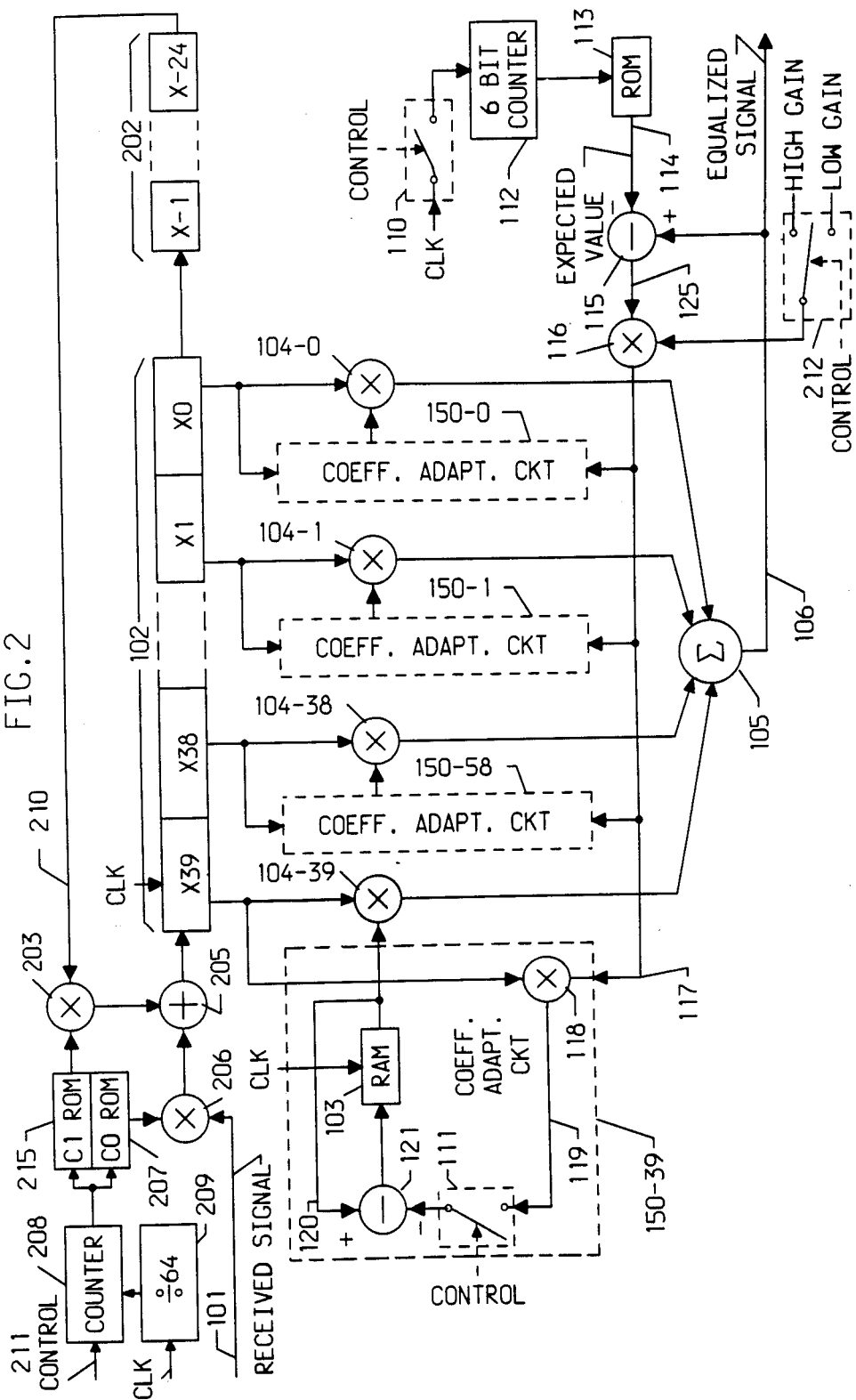
FIG. 2 is the automatic equalizer of FIG. 1 adapted to incorporate the principles of the present invention.

Refer now to FIG. 2 which shows the automatic equalizer of FIG. 1 modified to form averages of corresponding signal samples within a training period. To provide this sample averaging, each of the received samples on lead 101 is multiplied by a parameter $C_0$ and each of the preceding samples, i.e., the samples coupled through shift registers 102 and 202, is multiplied by a parameter $C_1$. Assuming that the 60 identical training sequences are designated as number 1-60 within a training period, the parameter $C_0$ decreases progressively with each training sequence and is equal to 1 divided by the current training sequence number, and parameter $C_1$ is equal to $1-C_0$. Consequently, for the 64 samples within the first training sequence, $C_0=1$ and $C_1=0$. For the 64 samples within the second training sequnce, $C_0$ and $C_1=\frac{1}{2}$... and for the 64 samples within the 60th training sequence, $C_0$ is 1/60 and $C_1=59/60$.

As shown in FIG. 2, each of the received samples on lead 101 is coupled through multiplier 206 wherein they are multiplied by parameter $C_0$ and then coupled through adder 205 to shift register 102. ROM register 207 stores the appropriate values of $C_0$ in 60 consecutive locations and reads out the value of $C_0$ in response to each address provided by counter 208. Counter 208, initialized at a 0 count, increments its count by 1 during a training period in response to every $64^{th}$ CLK pulse. Such pulses correspond to the beginning of each training sequence and are generated from the CLK pulses by divide by 64 circuit 209. At times other than the training period, counter 208 is inhibited and maintained at a 0 count by a microprocessor-generated control signal on lead 211. When addressed by zero, ROM register 207 advantageously provides a value of $C_0$ equal to 1. Accordingly, the received samples are not affected by multiplier 206 except during a training period.

The digital signal samples coupled through shift register 102 are supplied to 24-location shift register 202. The samples stored in register 202 are designated as X-1 through X-24 and are successively coupled therethrough on each CLK pulse. Shift register 202 is required in order to store the 64 samples corresponding to a training sequence and assure that corresponding samples arrive at adder 205 at the same time.

The samples clocked out of shift register 202 appear on lead 210 and are coupled to multiplier 203 wherein they are multiplied by parameter $C_1$. Parameter $C_1$ is stored within the 60 locations in ROM register 215 and is read out in response to an address generated by counter 208. Advantageously, a zero address to ROM 215 supplies a $C_1$ value of 0 so that multiplier 203 provides a 0 product to adder 205 except during a training period. During a training period, however, the parameter $C_1$ is progressively incremented so that the sum provided by adder 205 to shift register 102 is an average of the corresponding samples within the successive training sequences of a training period. Accordingly, the equalized signal on lead 106 and the adjustment of the tap-weight coefficients are based on corresponding sample averages so as to substantially reduce the time required for the convergence of the tap-weight coefficients to their optimum values and decrease the resulting coefficient errors. The operation of the coefficient adaptation circuits and generation of an error signal are identical to that described in FIG. 1, and corresponding circuitry in FIGS. 1 and 2 bears the same reference designations.

The automatic equalizer of FIG. 2 also advantageously incorporates a switch 212 which is set to provide a high gain constant or large scaling factor to multiplier 118 during a first portion of each training period. After this first portion has lapsed, switch 212, under the control of a microprocessor-generated control signal, toggles a low gain or low scaling constant to multiplier 116. This adaptive gain control further reduces the effects of noise during convergence of the tap-weight coefficients and provides more precise coefficient adjustment.

At the end of a training period, switch 111 opens and switch 212 switches to the high gain position. It is preferable, however, that switch 110 remain closed after the first training period to provide synchronization or subsequent training periods. Specifically, the fact that counter 112 is left running by the closure of switch 110 allows for millisecond errors in the closing time of switch 111 at the onset of subsequent training periods. Such millisecond errors are substantially larger than the CLK pulse period.

Figure 3:
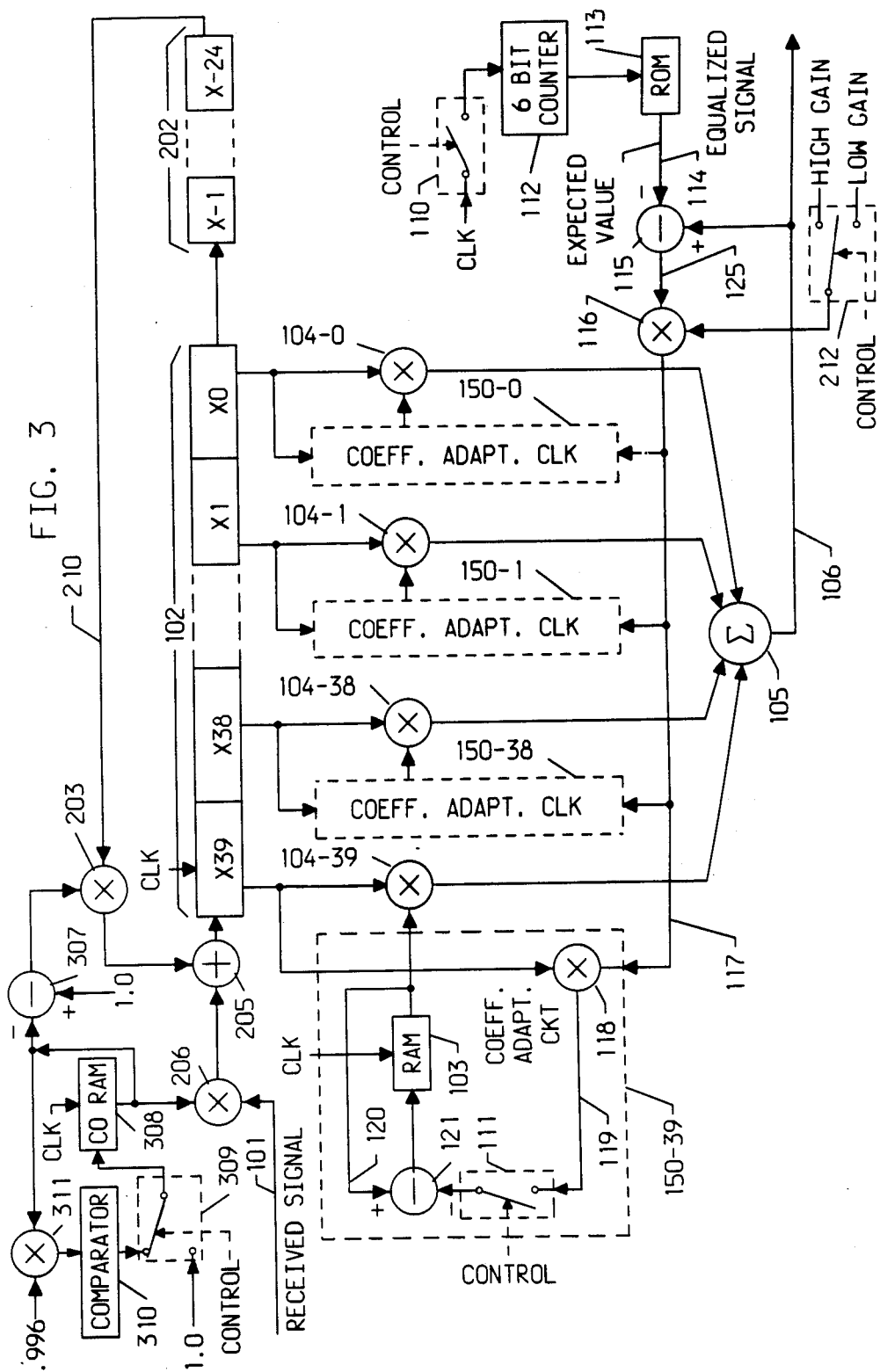
FIG. 3 is an alternate embodiment of the automatic equalizer of FIG. 2.

The FIG. 2 circuitry can be simplified as shown in FIG. 3 if, instead of generating corresponding sample averages using parameters $C_0$ and $C_1$ which are stored in 120 ROM locations, parameter $C_0$ is calculated as a decaying exponential function limited at 0.1 and $C_1 = 1 - C_0$. This use of a decaying exponential advantageously approximates corresponding sample averaging with near optimal performance while reducing circuit costs.

Referring to FIG. 3, successive samples of the received digital signal are coupled on lead 101 through multiplier 206 and summer 205 to shift register 102. As before, at the onset of a training period, a tone is sent to the receiver which causes microprocessor-generated control signals to close switches 110 and 111 and set switches 212 to a high gain position. This control signal also toggles switch 309 to couple a logic 1 to RAM register 308 which stores parameter $C_0$. The parameter $C_0$ is clocked from RAM register 308 to multiplier 206 on each CLK pulse. Adder 205 sums the product provided by multiplier 206 with the product formed by multiplier 203. This latter product is equal to $C_1$ times the signal on lead 210 where $C_1$ is equal to $1 - C_0$. The mathematical operation of subtracting parameter $C_0$ from 1 to form parameter $C_1$ is provided by subtractor 307. This difference is then available to multiplier 203 on each CLK pulse. Switch 309 couples a logic 1 to $C_0$ RAM register 308 for the first training sequence in any training period. After the first training sequence is completed, a microprocessor-generated control signal toggles switch 309 to the output of comparator 310. Consequently, the clocked $C_0$ output of RAM register 308 is coupled through multiplier 311 wherein it is multiplied by the constant 0.996. Comparator 310 then couples the product formed by multiplier 311 or the value 0.1, whichever is greater, back to RAM register 308. This operation progressively decreases the $C_0$ in an exponential manner after the first training sequence and, accordingly, progressively increases the parameter $C_1$ in an exponential fashion. As a result, the sum provided by adder 205 to shift register 102 is a combination of corresponding signal samples which substantially approximates a mathematical average. The operation of the remaining circuitry shown in FIG. 3 is identical to that of FIG. 2 and identical components have the same reference designations. Consequently, the equalized signal on lead 106 and the adaptation of the tap-weight coefficients during a training period are based on this combination of corresponding signal samples which approximates a mathematical average. As with the circuitry shown in FIG. 2, the circuitry of FIG. 3 substantially reduces the impact of updating the tap-weight coefficients in the presence of noise and, therefore, substantially reduces the time required for convergence of the tap-weight coefficients to their optimal values and the resultant coefficient errors.

Figure 4:
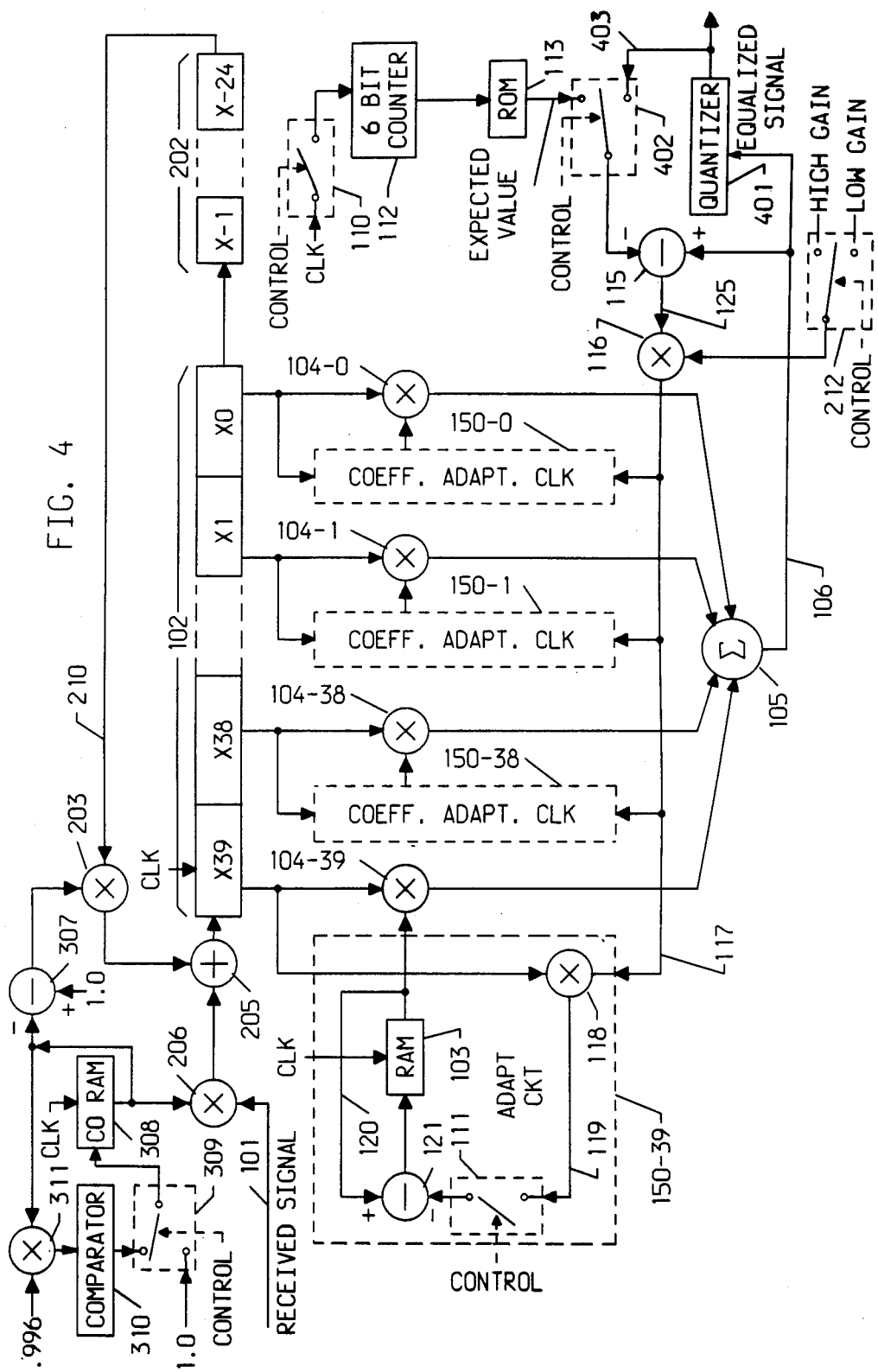
FIG. 4 is an adaptive transversal equalizer incorporating the principles of the present invention.

While the above description of the present invention relates to an automatic equalizer, the present invention can be easily incorporated into an adaptive equalizer. Refer now to FIG. 4 which shows the automatic equalizer structure of FIG. 3 modified to provide adaptive equalization. This modification merely requires the addition of quantizer 401 and switch 402. Quantizer 401 accepts the output of summer 105 and assigns it to the closest one of the transmitted digital signal levels. This assigned value appears on lead 403. During a training period, switch 402 is controlled by a microprocessor control signal in an identical fashion as switches 110 and 111 and the FIG. 4 circuitry operates in a manner identical to that of FIG. 3. After a training period is completed and unknown data is transmitted to the receiver, switch 402 couples the quantized signal on lead 403 to subtractor 115. As a result, subtractor 115 forms an error signal during nontraining periods which is the equalizer output of summer 105 minus the quantized signal on lead 403. This error signal is then used to update the tap-weight coefficients based on the unknown data whose values are estimated by quantizer 401. This use of quantizer 401 ad switch 402 can also be incorporated into the operation of the equalizer of FIG. 2.

It should, of course, be understood that while the present invention has been described in reference to particular embodiments, numerous other arrangements may be envisioned by those skilled in the art without departing from the spirit and scope of the present invention. First, for example, the present invention can be utilized within a fractionally-spaced equalizer, wherein the sampling clock is faster than the clock used for updating the tap-weight coefficients, simply by using the sampling clock for the shift registers and the tap-weight coefficient updating circuitry during a training period. Second, an automatic equalizer, in accordance with the present invention, can be used for equalizing an analog input signal, which is not limited to discrete values. Third, the plurality of multipliers shown in the drawings could be replaced by a single multiplier which is time-shared under microprocessor control.

What is claimed is:

1. An equalizer comprising
   means for receiving samples of a digital signal, said samples being arranged into successive sequences wherein each sequence comprises a plurality of samples and each sample in any sequence has a corresponding sample in another sequence.
   means for combining only the corresponding ones of said samples in said sequences during a predetermined time interval.
   means for multiplying selected ones of said combined samples by associated coefficients. and
   means for summing the products formed by said multiplying means to form an equalizer output.

2. The equalizer of claim 1 further including means for revising said associated coefficients as a function of said equalizer output 3. The equalizer of claim 2 wherein said combining means forms an average of each of said corresponding ones of said samples.

4. The equalizer of claim 2 wherein said combining means utilizes an exponential function which approximates averaging of each of said corresponding ones of said samples.

5. The equalizer of claim 1 wherein said selected ones of said combined samples are equal to all of said combined samples.

6. The equalizer of claim 1 wherein said selected ones of said combined samples are less than all of said combined samples.

7. The equalizer of claim 6 wherein said selected ones of said combined samples comprise consecutive digital signal samples.

8. The equalizer of claim 1 wherein said selected ones of said combined samples change as a function of time.

9. The equalizer of claim 1 wherein said predetermined time interval is a training period and said successive sequences are identical in the absence of noise and distortion in said received digital signal.

10. The equalizer of claim 1 wherein said multiplying means multiplies a plurality of said received samples by said associated coefficients during times other than said predetermined time interval.

11. The equalizer of claim 10 wherein said summing means adds the products formed by said multiplying means to form said equalizer output at times other than said predetermined time interval.

12. The equalizer of claim 11 further including means for revising said associated coefficients as a function of said equalizer output at times other than said predetermined time interval.

13. A method of adjusting the tap-weight coefficients of an equalizer, said method comprising the steps of
   receiving samples of a digital signal, said samples being arranged into successive sequences wherein each sequence comprises a plurality of samples and each sample in any sequence has a corresponding sample in another sequence.
   combining only the corresponding ones of said samples in said sequences during a predetermined time interval.
   forming an equalizer output by multiplying selected ones of said combined samples by associated coefficients and summing the products formed, and
   revising said associated coefficients as a function of said equalizer output.

14. An equalizer comprising
   means for combining each received signal sample with the nth sample only preceding and succeeding each received sample during a predetermined time interval, where n is an integer not less than two,
   a tapped delay line for receiving said combined samples, said delay line having a plurality of taps,
   a plurality of multipliers each connected to a different one of said delay line taps, each of said multipliers multiplying the information in the respective tap by an associated tap-weight coefficient, and
   means for summing the products formed by said multipliers.

15. The equalizer of claim 14 where n is not less than said plurality of multipliers.

16. The equalizer of claim 14 wherein said combining means forms averages of every nth sample.

17. The equalizer of claim 14 wherein said combining means approximates an average of every nth sample.

* * * * *